(12) United States Patent
Ikemura et al.

(10) Patent No.: US 12,355,273 B2
(45) Date of Patent: Jul. 8, 2025

(54) POWER RECEIVING DEVICE AND CONTACTLESS POWER TRANSMISSION SYSTEM

(71) Applicant: TOYOTA JIDOSHA KABUSHIKI KAISHA, Toyota (JP)

(72) Inventors: Ryosuke Ikemura, Susono (JP); Shogo Tsuge, Fuji (JP); Masato Maemura, Nisshin (JP); Toshiya Hashimoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/236,557

(22) Filed: Aug. 22, 2023

(65) Prior Publication Data
US 2024/0113565 A1 Apr. 4, 2024

(30) Foreign Application Priority Data

Sep. 29, 2022 (JP) .................. 2022-156606

(51) Int. Cl.
*H02H 9/04* (2006.01)
*H02H 3/02* (2006.01)
*H02J 50/10* (2016.01)
*H02J 50/12* (2016.01)
*H02J 50/80* (2016.01)

(52) U.S. Cl.
CPC ............ *H02J 50/80* (2016.02); *H02H 9/041* (2013.01); *H02J 50/12* (2016.02)

(58) Field of Classification Search
CPC ............ H02J 50/80; H02J 50/12; H02J 9/041

USPC ......................................... 307/104
See application file for complete search history.

(56) References Cited

U.S. PATENT DOCUMENTS

| 10,298,069 B2 | 5/2019 | Arasaki et al. |
| 2015/0357863 A1 | 12/2015 | Sadakata et al. |
| 2016/0043562 A1 | 2/2016 | Lisi et al. |
| 2021/0013742 A1* | 1/2021 | Nakao ............. H02J 50/80 |
| 2022/0376553 A1 | 11/2022 | Yoshida et al. |
| 2024/0055910 A1* | 2/2024 | Katsuya ............. B60L 53/126 |

FOREIGN PATENT DOCUMENTS

| JP | 2018-014884 A | 1/2018 |
| JP | 6361818 B2 | 7/2018 |
| KR | 10-2022-0100665 A | 7/2022 |

* cited by examiner

*Primary Examiner* — Rexford N Barnie
*Assistant Examiner* — Swarna N Chowdhuri
(74) *Attorney, Agent, or Firm* — Oliff PLC

(57) ABSTRACT

A power receiving device includes: a power receiving coil receiving power transmitted from a power transmission coil; a rectifier circuit between the power receiving coil and a load; a smoothing capacitor between the rectifier circuit and the load; and a control device executing a short-circuit mode of short-circuiting between output ends of the power receiving coil. Further, the control device includes an acquisition unit acquiring information indicating a drive frequency of an inverter in the power transmission device, a setting unit setting a switching frequency of the rectifier circuit to a value different from the drive frequency of the inverter, and a control unit executing the short-circuit mode based on the switching frequency set by the setting unit.

5 Claims, 13 Drawing Sheets

POWER RECEIVING DEVICE AND CONTACTLESS POWER TRANSMISSION SYSTEM

CROSS-REFERENCE TO RELATED APPLICATION(S)

The present application claims priority to and incorporates by reference the entire contents of Japanese Patent Application No. 2022-156606 filed in Japan on Sep. 29, 2022.

BACKGROUND

The present disclosure relates to a power receiving device and a contactless power transmission system.

Japanese Patent No. 6361818 discloses providing switching elements for power control in a power receiving device of a contactless power transmission system, and avoiding an excessive voltage rise by stopping charging by forming a short circuit by controlling an operation of the switching element in a case where a voltage on a power receiving device side exceeds a reference value.

SUMMARY

There is a need for providing a power receiving device and a contactless power transmission system that can suppress a power increase when a short circuit is formed by an operation of switching elements.

According to an embodiment, A power receiving device includes: a power receiving coil receiving power transmitted in a contactless manner from a power transmission coil of a power transmission device; a rectifier circuit provided between the power receiving coil and a load; a smoothing capacitor provided between the rectifier circuit and the load; and a control device executing a short-circuit mode of short-circuiting between output ends of the power receiving coil, by performing a switching operation on switching elements provided in the rectifier circuit. Further, the control device includes an acquisition unit acquiring information indicating a drive frequency of an inverter provided in the power transmission device, a setting unit setting a switching frequency of the rectifier circuit to a value different from the drive frequency of the inverter, and a control unit executing the short-circuit mode based on the switching frequency set by the setting unit.

DETAILED DESCRIPTION

In the related art, based on findings obtained by the present inventors, it has been seen that, when power suppression control of forming a short circuit using switching elements is performed, a phenomenon in which power rather increases rapidly and exceeds a targeted value (overshoot) occurs. The rated value exceedance caused by the overshoot might lead to battery degradation and breakage. In this case, it is considered to provide a safety margin between a rated value and a targeted value of power control on the assumption that the overshoot occurs, but this leads to a decrease in received power received during contactless charging.

Hereinafter, a power receiving device and a contactless power transmission system according to an embodiment of the present disclosure will be specifically described with reference to the drawings. Note that the present disclosure is not limited to the embodiments to be described below.

Figure 1:
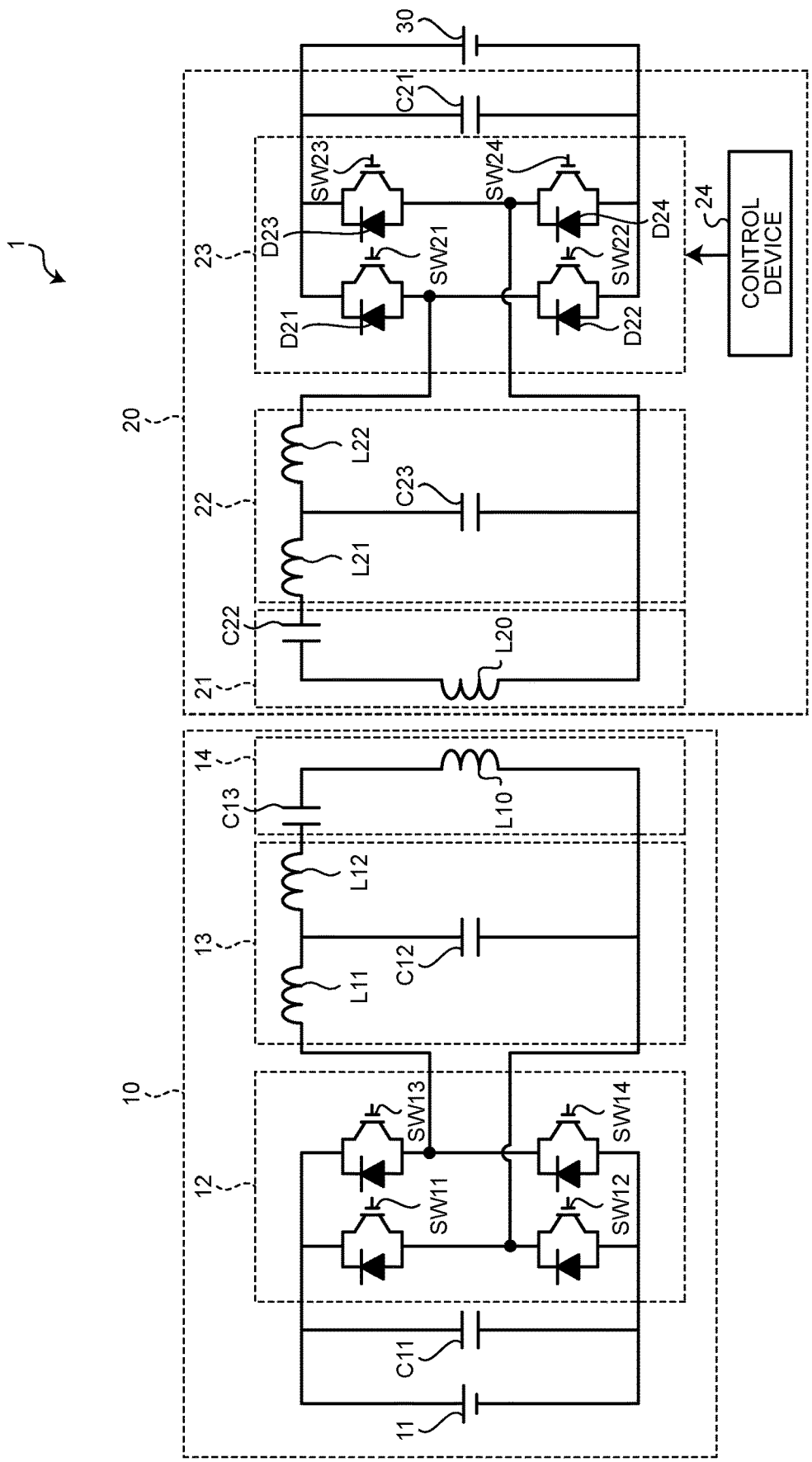
FIG. 1 is a diagram schematically illustrating a contactless power transmission system according to an embodiment.

FIG. 1 is a diagram schematically illustrating a contactless power transmission system according to an embodiment. A contactless power transmission system 1 includes a power transmission device 10 and a power receiving device 20. The contactless power transmission system 1 is a wireless power transmission system, and transmits power in a contactless manner from a power transmission coil L10 of the power transmission device 10 to a power receiving coil L20 of the power receiving device 20. A battery 30 being a load on a power receiving side is electrically connected to the power receiving device 20.

The power transmission device 10 includes a direct-current power source 11, a smoothing capacitor C11, an inverter 12, a filter circuit 13, and a power transmission side resonance circuit 14.

The direct-current power source 11 supplies direct-current power to the inverter 12. The smoothing capacitor C11 is provided between the direct-current power source 11 and the inverter 12. The smoothing capacitor C11 is connected in parallel with the inverter 12.

The inverter 12 is a power conversion device that converts direct-current power supplied from the direct-current power source 11, into alternating-current power.

The inverter 12 is formed into a full-bridge circuit in which four switching elements SW11, SW12, SW13, and SW14 are full-bridge-connected. Diodes are connected in parallel to the respective switching elements SW11 to SW14. Each of the switching elements SW11 to SW14 is formed by an insulated gate bipolar transistor (IGBT), and performs a switching operation in accordance with a control signal. The inverter 12 supplies converted alternating-current power to the filter circuit 13.

The filter circuit 13 removes noise included in alternating current input from the inverter 12, and outputs noise-removed alternating-current power to the power transmission side resonance circuit 14. The filter circuit 13 is a T-type filter in which a coil L11, a capacitor C12, and a coil L12 are arranged in a T shape.

The power transmission side resonance circuit 14 includes the power transmission coil L10 and a resonance capacitor C13. The power transmission coil L10 transmits alternating-current power supplied from the filter circuit 13, to the power receiving device 20 in a contactless manner. The power transmission coil L10 forms an LC resonance circuit together with the resonance capacitor C13. The resonance capacitor C13 is connected in series to one end of the power transmission coil L10, and adjusts a resonance frequency of the LC resonance circuit.

The power receiving device 20 includes a power receiving side resonance circuit 21, a filter circuit 22, a rectifier 23, a smoothing capacitor C21, and a control device 24. The power receiving device 20 receives power from the power transmission device 10 in a contactless manner.

The power receiving side resonance circuit 21 includes the power receiving coil L20 and a resonance capacitor C22. The power receiving coil L20 receives power transmitted in a contactless manner from the power transmission coil L10. The power receiving coil L20 forms an LC resonance circuit together with the resonance capacitor C22. The resonance capacitor C22 adjusts a resonance frequency of the LC resonance circuit.

The filter circuit 22 removes noise included in alternating current input from the power receiving side resonance circuit 21, and outputs noise-removed alternating-current power to the rectifier 23. The filter circuit 22 is a T-type filter in which a coil L21, a capacitor C23, and a coil L22 are arranged in a T shape.

The rectifier 23 is a rectifier circuit that converts alternating-current power input from the filter circuit 22, into direct-current power, and outputs the direct-current power to the battery 30. The rectifier 23 is formed into a full-bridge circuit in which four diodes D21, D22, D23, and D24 serving as rectifying devices are full-bridge-connected. One end of the filter circuit 22 is connected to a connection point between an anode of the diode D21 and a cathode of the diode D22. Another end of the filter circuit 22 is connected to a connection point between an anode of the diode D23 and a cathode of the diode D24.

Switching elements are connected in parallel to the respective diodes D21, D22, D23, and D24. A switching element SW21 is connected in parallel to the diode D21. A switching element SW22 is connected in parallel to the diode D22. A switching element SW23 is connected in parallel to the diode D23. A switching element SW24 is connected in parallel to the diode D24. Each of the switching elements SW21 to SW24 is formed by an insulated gate bipolar transistor (IGBT), and performs a switching operation in accordance with a control signal from the control device 24.

The rectifier 23 supplies the converted direct-current power to the battery 30. The smoothing capacitor C21 is provided between the rectifier 23 and the battery 30. The smoothing capacitor C21 is connected in parallel with the rectifier 23.

The control device 24 is an electronic control device that controls the rectifier 23. Signals from various sensors provided in the power receiving device 20 are input to the control device 24. Then, the control device 24 executes various types of control based on the signals input from the various sensors.

For example, the control device 24 executes power control of controlling power to be supplied to the battery 30 during contactless charging. The contactless power transmission system 1 is configured to form a short-circuit path using the switching elements SW21 to SW24 of the power receiving device 20 during contactless charging, and suppress an amount of power to be supplied to a load, for the purpose of protecting the load on the power receiving side. Thus, the control device 24 executes power control during contactless charging, and controls each of the switching elements SW21 to SW24 of the rectifier 23.

The power control includes a diode mode and a short-circuit mode. The control device 24 can switch a mode between the diode mode and the short-circuit mode.

Figure 2:
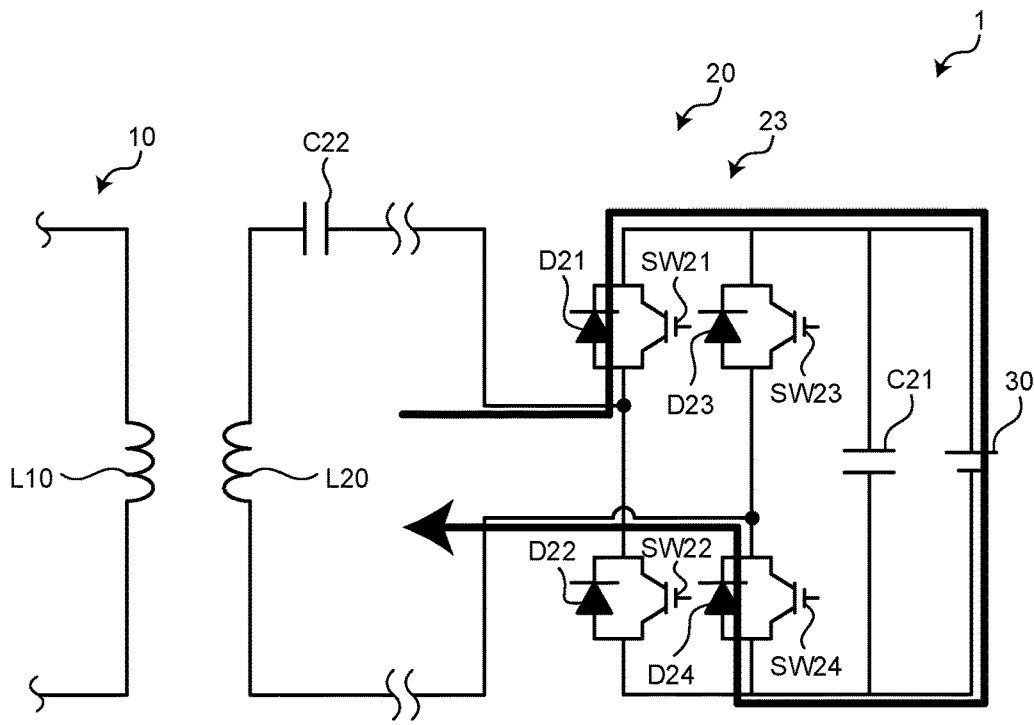
FIG. 2 is a diagram for describing a current pathway in a diode mode.

The diode mode is control of causing a state in which a current flows to the battery 30, and received power is supplied to the battery 30 from the power receiving device 20. In the diode mode, all the switching elements SW21, SW22, SW23, and SW24 of the rectifier 23 are controlled to enter an off state. As indicated by an arrow in FIG. 2, a path of current in the diode mode becomes a path of returning back via the diode D21, the battery 30, and the diode D24. Note that a current of the battery 30 will be sometimes described as a battery current.

The short-circuit mode is control of causing a state in which a current returns back without flowing into the battery 30. More specifically, the short-circuit mode is a mode in which a current return back to the power receiving coil L20 side from the rectifier 23. In the short-circuit mode, the switching elements SW21, SW22, and SW24 of the rectifier 23 are controlled to enter the off state, and the switching element SW23 is controlled to enter an on state. As indicated by an arrow in FIG. 3, a path of current in the short-circuit mode becomes a path of returning back via the diode D21 and the switching element SW23.

Figure 3:
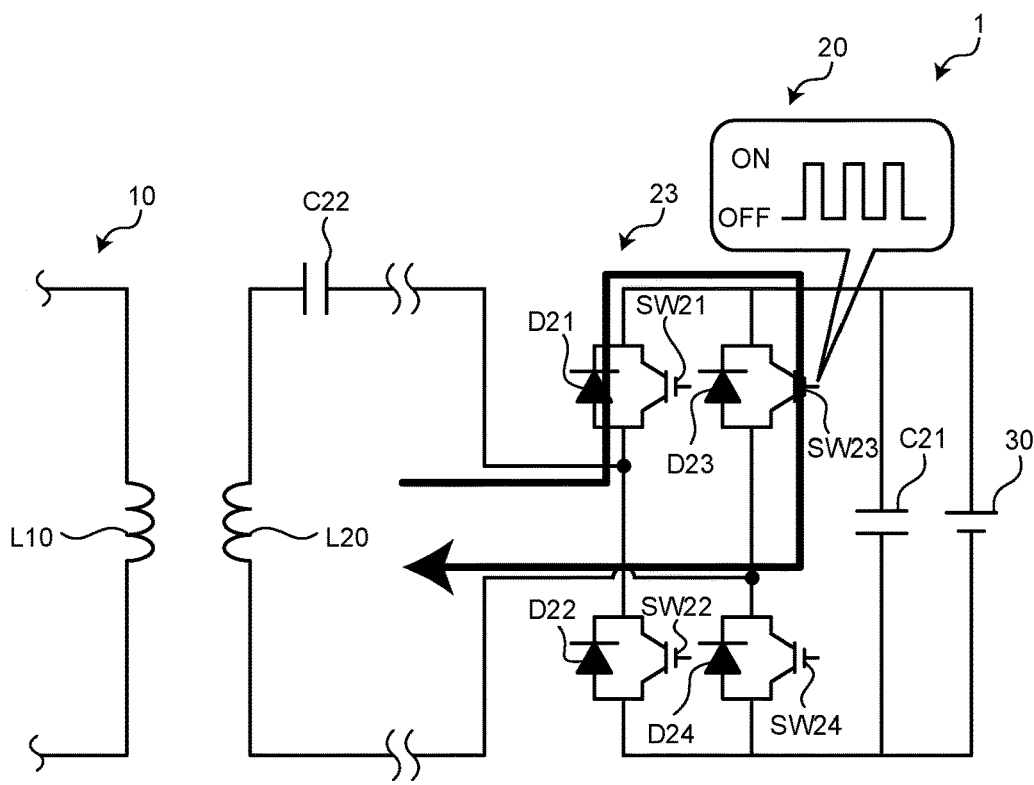
FIG. 3 is a diagram for describing a current pathway in a short-circuit mode.

By the control device 24 executing the short-circuit mode, an amount of power to be supplied to the battery 30 can be reduced. When reducing received power of the battery 30, the control device 24 executes control of switching a mode between the diode mode and the short-circuit mode. As illustrated in FIG. 3, the control device 24 executes switching control of switching the state of the switching element S23 between the off state and the on state.

Figure 4:
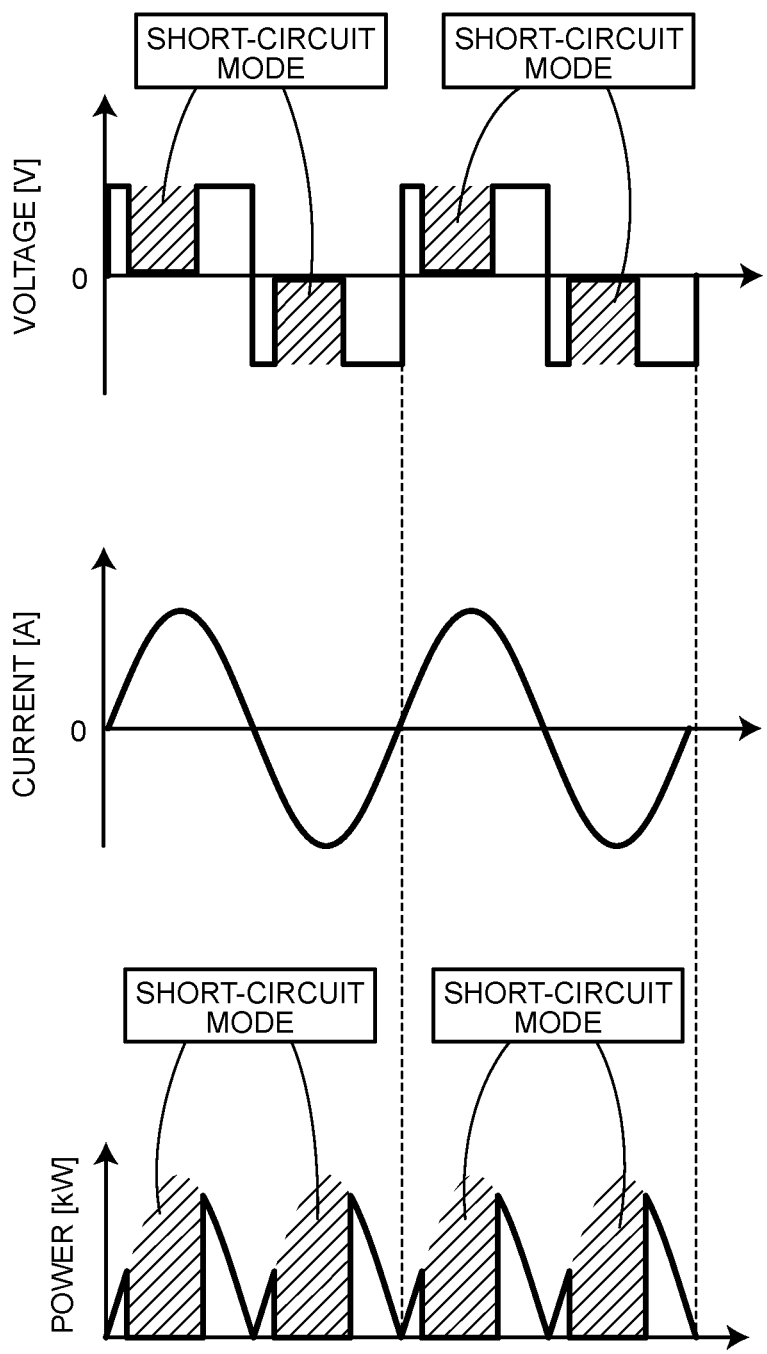
FIG. 4 is a diagram illustrating a voltage and a current to be applied on an input side of a rectifier, and received power to be supplied to a battery, when the short-circuit mode is executed.

Further, as illustrated in FIG. 4, during the short-circuit mode, a current waveform on an input side of the rectifier 23 does not undergo significant change, and a voltage becomes zero. That is, a current waveform in the rectifier 23 does not undergo significant change between the diode mode and the short-circuit mode. Then, because an output voltage of the rectifier 23 becomes zero during the short-circuit mode, received power of the battery 30 becomes zero.

Figure 5:
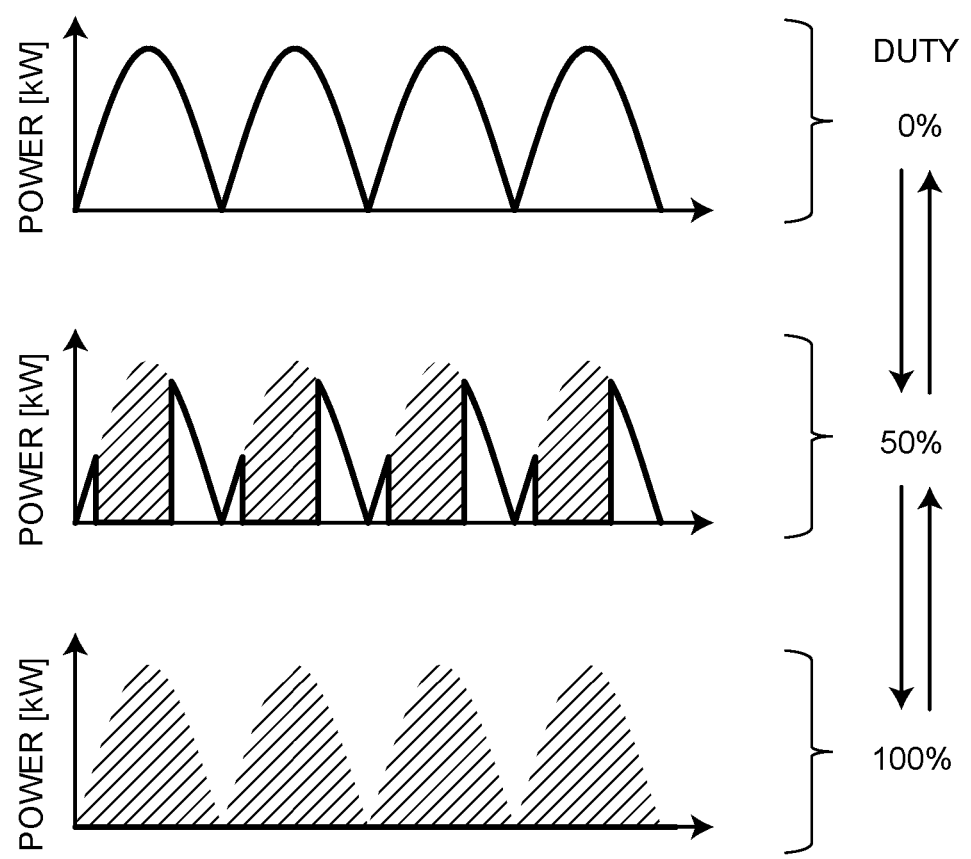
FIG. 5 is a diagram illustrating a relationship between a duty and received power in the short-circuit mode.

Further, the control device 24 controls a duty indicating a ratio of the short-circuit mode in a voltage square wave, to 0% to 100%. As illustrated in FIG. 5, the control device 24 controls received power of the battery 30 to fall within the range from 0% to 100%, by operating the duty of the short-circuit mode.

In the contactless power transmission system 1 having the above-described configuration, by the control device 24 executing power control during contactless charging, it is possible to a power increase of the battery 30 and protect the battery 30.

For example, the contactless power transmission system 1 is a system configured to be able to perform wireless power supply to a running vehicle in a case where the power transmission device 10 is a ground side unit installed on the ground, and the power receiving device 20 is a vehicle side unit mounted on a vehicle. Because this vehicle is a battery electric vehicle equipped with the battery 30, the vehicle can perform regenerative charging of the battery 30 by performing regeneration while running. Thus, in a case where regeneration and contactless charging are simultaneously performed during running, excessive power is supplied to the battery 30, and degradation and breakage of the battery 30 might be caused. To prevent this, the control device 24 executes power control and reduces received power to be received by contactless charging. That is, the control device 24 performs control in such a manner as to prioritize regeneration and reduce the execution of contactless charging.

Nevertheless, the present inventors have conducted a wireless power supply test that uses an actual vehicle, and when power control that uses the switching elements on the power receiving device 20 side has been tried, it has been seen that overshoot in which received power of the battery 30 exceeds a targeted value by almost twofold occurs.

Figure 6:
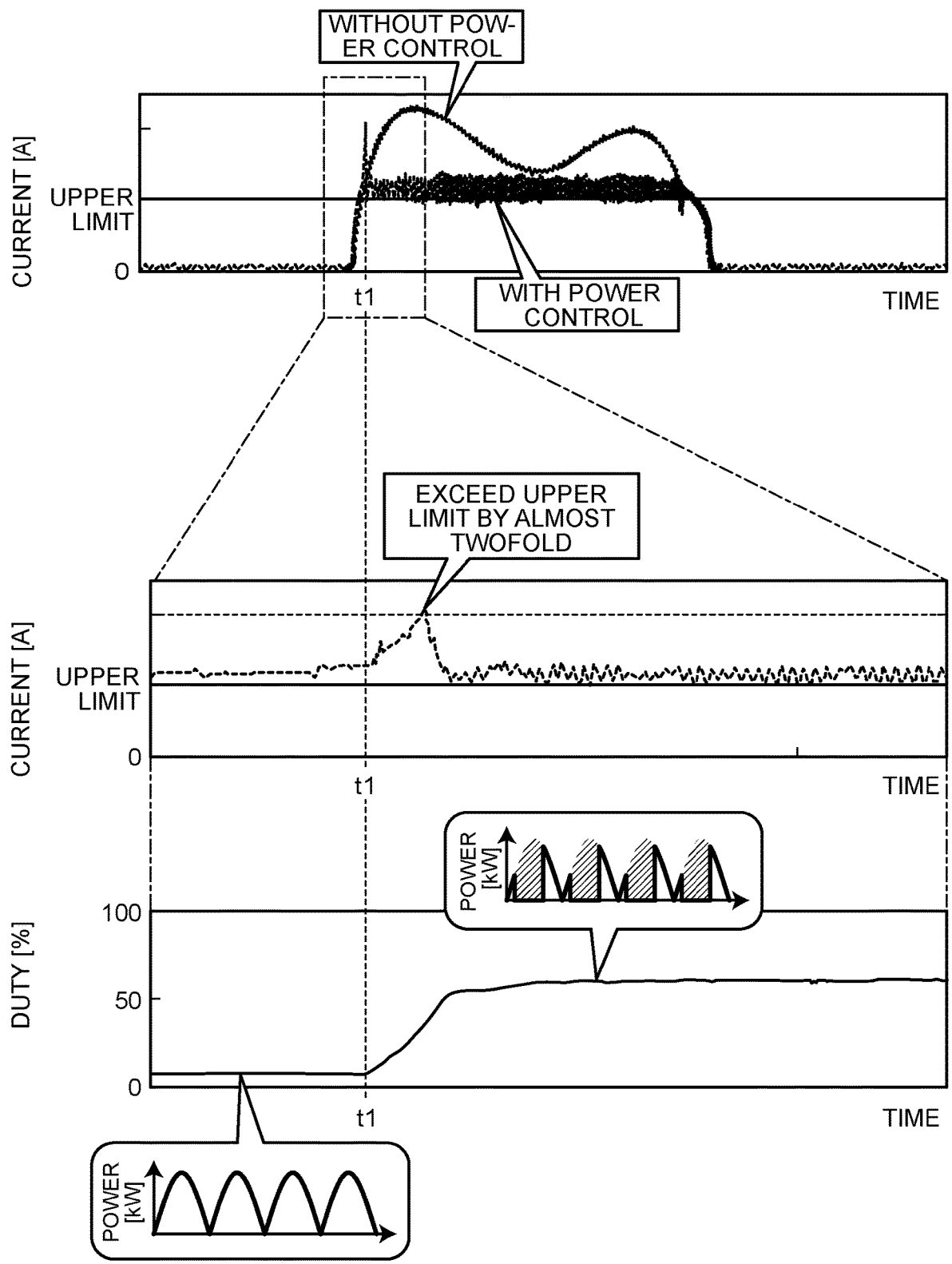
FIG. 6 is a diagram illustrating a result of a wireless power supply test that uses an actual vehicle.

FIG. 6 is a diagram illustrating a result of a wireless power supply test that uses an actual vehicle. Note that FIG. 6 exemplifies a test result of dynamic power supply executed when a vehicle equipped with the power receiving coil L20 passes above the power transmission coil L10. Further, an upper part of FIG. 6 illustrates changes in battery current that occur in accordance with the presence or absence of power control. A middle part of FIG. 6 illustrates a change in battery current that occurs when power control is executed, as an enlarged view of a part of the upper part of FIG. 6. A lower part of FIG. 6 illustrates a change in duty that corresponds to the middle part of FIG. 6.

As illustrated in the upper part of FIG. 6, in a case where power control is not executed during contactless charging, a current of the battery 30 (battery current) naturally increases to exceed an upper limit. Thus, the received power of the battery 30 naturally increases. In a case where power control is executed during contactless charging to avoid this, the control device 24 starts power control if a battery current reaches an upper limit during contactless charging (time t1). Nevertheless, immediately after the time t1, at the moment that the control device 24 started power control and a duty being an operation amount of the rectifier 23 started to increase, the battery current has started to rapidly increase and received power has started to increase. At this time, the battery current has exceeded the upper limit by almost twofold. More specifically, while the duty is increasing from 0% up to almost 50%, the battery current continues to rapidly increase especially near the duty of 10% to 20%, and reaches a value close to the twofold of the upper limit, and if the increase of the duty stops, the battery current decreases to a value close to the upper limit. During the time period, received power has increased in accordance with the increase of the battery current. In the phenomenon, the momentum of power increase has an anomalous waveform as compared with a power waveform obtained when a vehicle passes above the power transmission coil L10 in a state in which power control is not executed. From this, it is considered that executing the short-circuit mode using the rectifier 23 has caused a power increase contrary to the original purpose (power decrease).

In view of the foregoing, the present inventors have considered a mechanism of causing an increase in received power by a short circuit formed by the rectifier 23.

Figure 7:
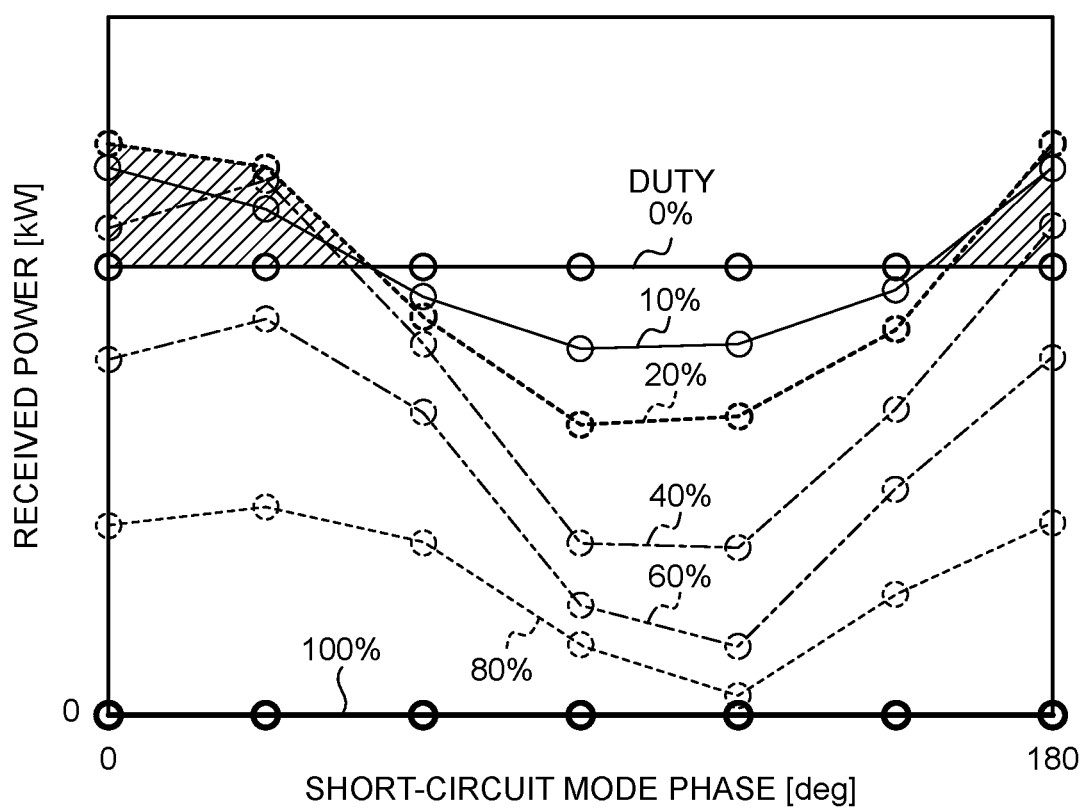
FIG. 7 is a diagram illustrating a relationship between received power of the battery, a phase of the short-circuit modem, and a duty.

First of all, the present inventors have considered a relationship between a value of the duty and received power while focusing attention on a phenomenon in which received power increases when the duty of the short-circuit mode increases. As a result, as illustrated in FIG. 7, it has been seen that, there is a combination of a duty and a phase that causes a power increase as compared with received power received in a case where the duty is 0%, although the duty is larger than 0%.

For example, in a case where the duty is 60% or more, that is to say, in a case where the duty is large to some extent, received power decreases in any phase. On the other hand, in a case where the duty is 40% or less, that is to say, in a case where the duty is small, received power increases in a specific phase. It has been seen that, especially in a case where the duty is 10% to 20%, a power increase becomes particularly large. Further, phases in which a power increase occurs include the range from 0 to 40 degrees and the range from 160 degrees to 180 degrees.

That is, as a first contributing factor, contributing factors include the existence of a condition under which received power becomes larger than that in a case where the duty is 0% in a specific phase, in a case where the duty is small. In a case where the duty is controlled by the power control to become 50%, as illustrated in FIG. 6, the duty gradually increases from 0%. During the increase process, the duty passes through the range equal to or smaller than 40% that causes an increase in received power as illustrated in FIG. 7. In this range, as illustrated in FIG. 7, there is a condition under which power becomes larger than received power received in a case where the duty is 0%, depending on a phase (switching timing) in which the short-circuit mode is executed. Thus, when the duty passes through the range, if a phase of the short-circuit mode is set to 0 degrees to 40 degrees or 160 degrees to 180 degrees, received power is increased by the power control.

The present inventors have further continued the consideration of a mechanism of causing an increase in received power by a short circuit formed by the rectifier 23. As a result, contributing factors include the following second to fifth contributing factors.

As the second contributing factor, contributing factors include a characteristic variation attributed to the capacity of capacitors and the numbers of turns of coils, and mutual interaction between ferrite cores of the power transmission coil L10 and the power receiving coil L20. Due to the characteristic variation and the mutual interaction between the ferrite cores, a circuit constant such as an inductance shifts from a designed value, and a resonance frequency of a circuit shifts from a drive frequency of the inverter 12. For example, in a case where the drive frequency of the inverter 12 is fixed to 85 kHz, a resonance frequency of the power transmission side resonance circuit 14 shifts to 84 kHz or 83 kHz, and a resonance frequency of the power receiving side resonance circuit 21 shifts to 84 kHz or 83 kHz.

Figure 8:
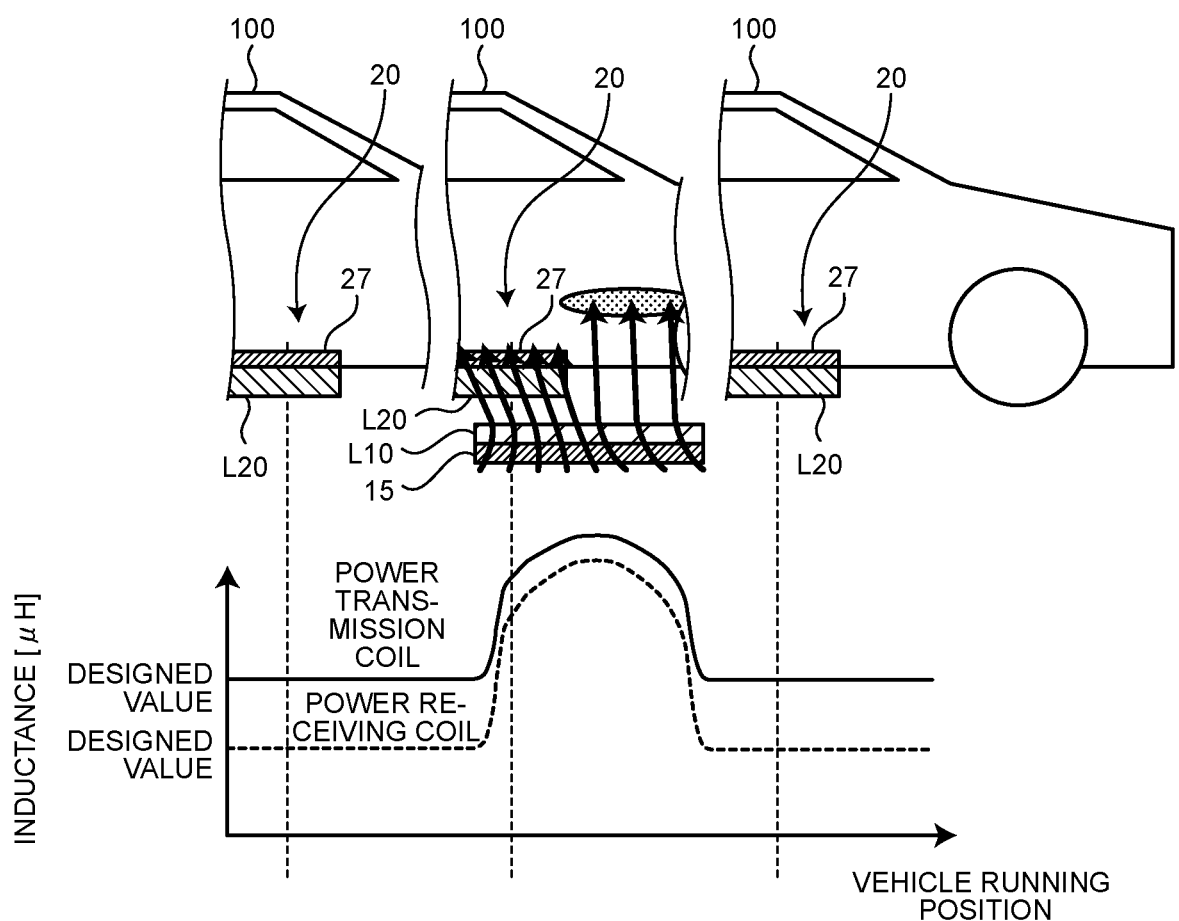
FIG. 8 is a diagram for describing a change of an inductance that occurs in accordance with a positional relationship between a power transmission coil and a power receiving coil.

As illustrated in FIG. 8, when the power receiving device 20 mounted on a vehicle 100 passes above the power transmission coil L10 installed on the ground, while a positional relationship between a ferrite core 15 of the power transmission coil L10 and a ferrite core 27 of the power receiving coil L20 changing, due to the mutual interaction between the ferrite cores, an inductance shifts from a designed value.

As the third contributing factor, contributing factors include a decrease in a phase factor of received power that is caused by a phase shift between a fundamental wave component of current and a fundamental wave component of voltage that is generated by a waveform of current flowing in a circuit, deforming due to a shift of a circuit constant from a designed value that is attributed to the second contributing factor. The phase factor of received power is represented by a cosine of a phase shift. A formula of received power is represented as "P=I*V*cos Δθ". In the formula, Δθ denotes a phase shift (phase difference). In the formula, cos Δθ denotes a phase factor.

Figure 9:
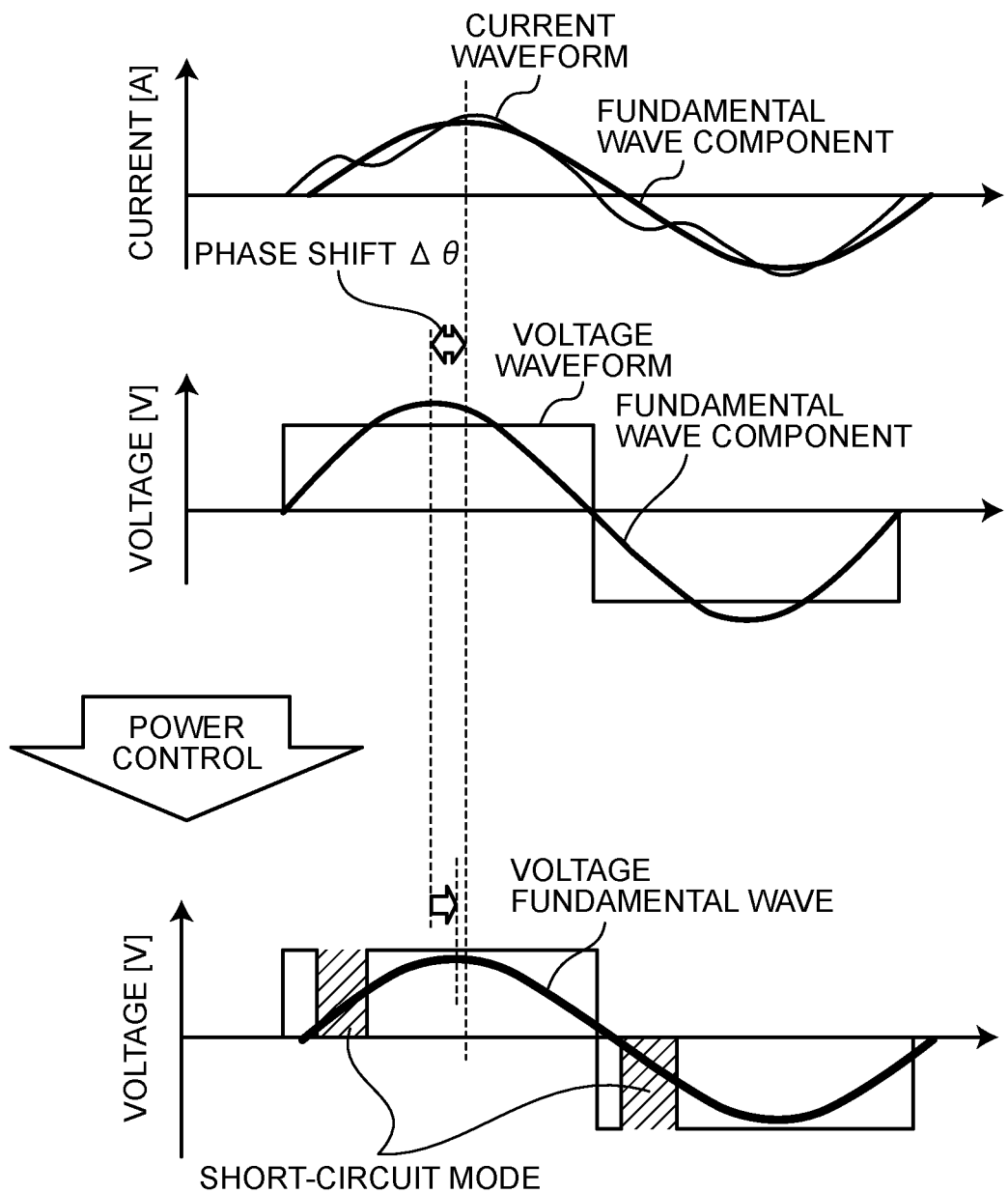
FIG. 9 is a diagram illustrating an example of a case where power control is executed in a state in which a phase of current is later than a phase of voltage.

As illustrated in FIG. 8, by a circuit constant shifting from a designed value and a current waveform deforming, as illustrated in FIG. 9, for example, the phase shift Δθ is generated in such a manner that a fundamental wave component of current (current fundamental wave) becomes later than a phase of a fundamental wave component of voltage (voltage fundamental wave). The phase factor of received power decreases in accordance with the phase shift Δθ. If the phase factor decreases, received power decreases.

As the fourth contributing factor, contributing factors include a phenomenon in which, if power control is executed and a short circuit is formed by the rectifier 23, although a period during which a voltage square wave becomes zero is generated, a voltage fundamental wave is accordingly pushed out leftward and rightward (phase shifts). The shifted phase includes a direction of worsening the phase factor, and a direction of improving the phase factor.

As illustrated in FIG. 9, when power control is executed in a state in which the phase of current is later than the phase of voltage, in a case where the voltage fundamental wave is pushed out rightward due to the phase of the short-circuit mode, the phase of the voltage fundamental wave shifts in a direction of resolving the phase shift Δθ from the current fundamental wave, and the phase factor decreased by the third contributing factor improves.

Further, as illustrated in FIG. 9, a voltage waveform (voltage square wave) is a waveform including two protrusions (protrusion of positive voltage and protrusion of negative voltage) in one cycle. In the description, for one protrusion of the voltage square wave, the left side will be referred to as a phase advanced side and the right side will be referred to as a phase delayed side. The right side of the voltage square wave refers to both of the right side of the protrusion of positive voltage and the right side of the protrusion of negative voltage. The left side of the voltage square wave refers to both of the left side of the protrusion of positive voltage and the left side of the protrusion of negative voltage.

Figure 10:
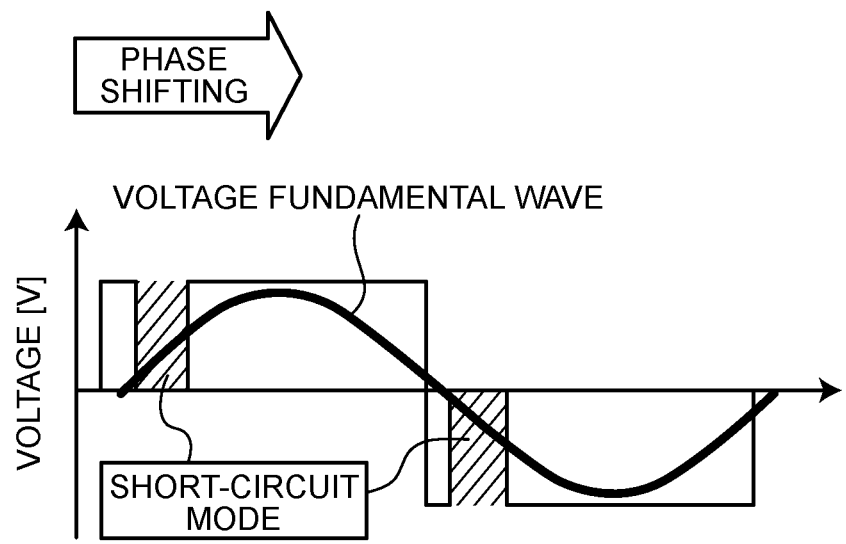
FIG. 10 is a diagram for describing phase shifting of a voltage fundamental wave that occurs in a case where the short-circuit mode is executed in a short-circuit phase of shearing off the left side of a voltage square wave as power control.
Figure 11:
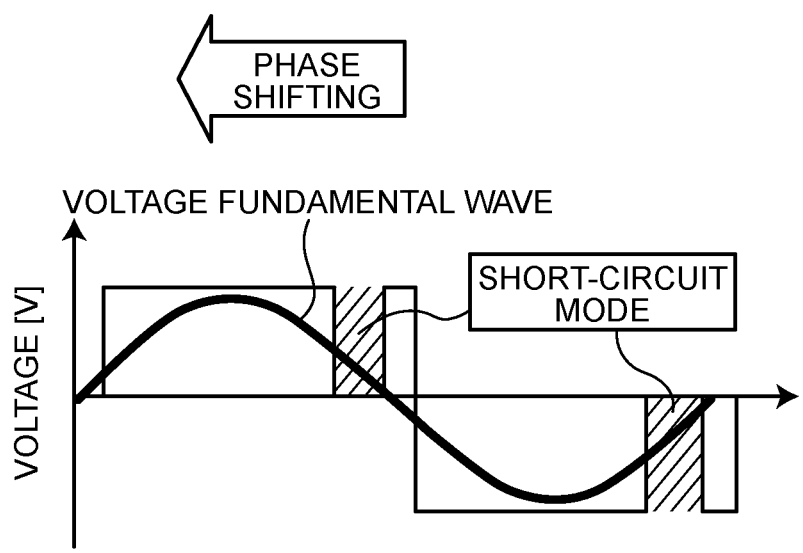
FIG. 11 is a diagram for describing phase shifting of a voltage fundamental wave that occurs in a case where the short-circuit mode is executed in a short-circuit phase of shearing off the right side of a voltage square wave as power control.

For example, as illustrated in FIG. 10, in a case where power control is executed by setting the phase of the short-circuit mode in such a manner as to shear off the left side of the voltage square wave, phase shifting by which the voltage fundamental wave is pushed out rightward occurs. As illustrated in FIG. 11, in a case where power control is executed by setting the phase of the short-circuit mode is set in such a manner as to shear off the right side of the voltage square wave, phase shifting by which the voltage fundamental wave is pushed out leftward occurs.

Furthermore, when power control is executed, as a period (duty) during which the voltage square wave becomes zero becomes longer, an amplitude of the voltage fundamental wave becomes smaller. As illustrated in FIG. 9, as compared with an amplitude of the voltage fundamental wave generated before power control is executed (in a case where the duty is 0%), an amplitude of the voltage fundamental wave generated while power control is being executed (in a case where the duty is larger than 0%) is smaller.

As the fifth contributing factor, contributing factors include an increase in received power that is caused by a short circuit formed by the rectifier 23, in a case where a phase factor improvement effect caused by the fourth contributing factor is applicable to a dominating condition. Received power to be received while power control is being executed is determined by the multiplication of an amplitude decrease of the voltage fundamental wave by a phase factor improvement effect or a phase factor worsening effect caused by phase shifting. If power control is started, a duty is increased in such a manner that received power becomes equal to or smaller than a targeted value, but if the phase factor improvement effect becomes dominant over the amplitude decrease of the voltage fundamental wave during the increase process, power unintentionally increases.

Especially in a case where the fifth contributing factor and the first contributing factor overlap, a rapid increase in battery current as illustrated in FIG. 6, that is to say, a rapid increase in power to be supplied to the battery 30 might occur. As a countermeasure for this, the contactless power transmission system 1 is configured to suppress a power increase caused by the formation of a short-circuit path, by suppressing a power increase caused by the fifth contributing factor.

Thus, when executing power control of forming a short circuit during contactless charging, the control device 24 controls a switching frequency of the rectifier 23 to a value different from a drive frequency of the inverter 12, to suppress a power increase caused by switching. The control device 24 preliminarily acquires information indicating a drive frequency of the inverter 12 on a power transmission side, and intentionally sets a value different from the drive frequency as a switching frequency.

Specifically, the control device 24 includes an acquisition unit that acquires the drive frequency of the inverter 12, a setting unit that sets a switching frequency of the rectifier 23 in the short-circuit mode, and a control unit that executes power control in accordance with the switching frequency.

The acquisition unit acquires information indicating the drive frequency of the inverter 12. The power receiving device 20 includes a communication unit that performs wireless communication with an infrastructure. By the wireless communication with the infrastructure, the communication unit receives information regarding the power transmission device 10. The received information regarding the power transmission device 10 includes information indicating the drive frequency of the inverter 12. By using the received information indicating the drive frequency of the inverter 12, the control device 24 can recognize the drive frequency of the inverter 12 before power control is performed. The acquisition unit acquires the information indicating the drive frequency of the inverter 12, before the control unit executes power control.

Based on the drive frequency of the inverter 12 that has been acquired by the acquisition unit, the setting unit sets a switching frequency of the rectifier 23 in the short-circuit mode to a value different from the drive frequency. In power control, the control device 24 intentionally controls the switching frequency to become a value different from the drive frequency, without controlling the switching frequency to become the same frequency as the drive frequency. For example, the setting unit sets the switching frequency of the rectifier 23 to a value larger than the drive frequency of the inverter 12.

Figure 12:
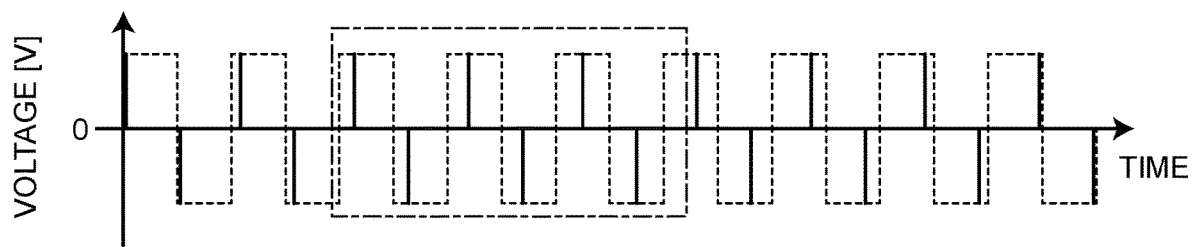
FIG. 12 is a diagram for describing that a phase in which the short-circuit mode is executed shifts with respect to a voltage square wave.

More specifically, the setting unit sets, as the switching frequency, a frequency at which the short-circuit mode is executed twice during one cycle of a voltage square wave. The switching frequency can be defined by the number of times the short-circuit mode is executed during one cycle of the voltage square wave. The switching frequency is a value larger than the drive frequency, and as illustrated in FIG. 12, is a frequency at which a phase in which the short-circuit mode is executed (switching timing) gradually shifts with respect to a voltage square wave of the rectifier 23, and sweeps between 0 degrees to 180 degrees. In the example illustrated in FIG. 12, while the voltage square wave goes through nine cycles, a phase in which the short-circuit mode is executed goes through one cycle in such a manner as to sweep between 0 degrees to 180 degrees. In this manner, the control device 24 can set a value larger than an integral multiple of the drive frequency of the inverter 12 as a switching frequency. In the example illustrated in FIG. 12, the switching frequency is larger than a doubled value of the drive frequency of the inverter 12. Note that FIG. 13 illustrates an enlarged view of a portion surrounded by a dashed-dotted line in the voltage square wave illustrated in FIG. 12.

Figure 13:
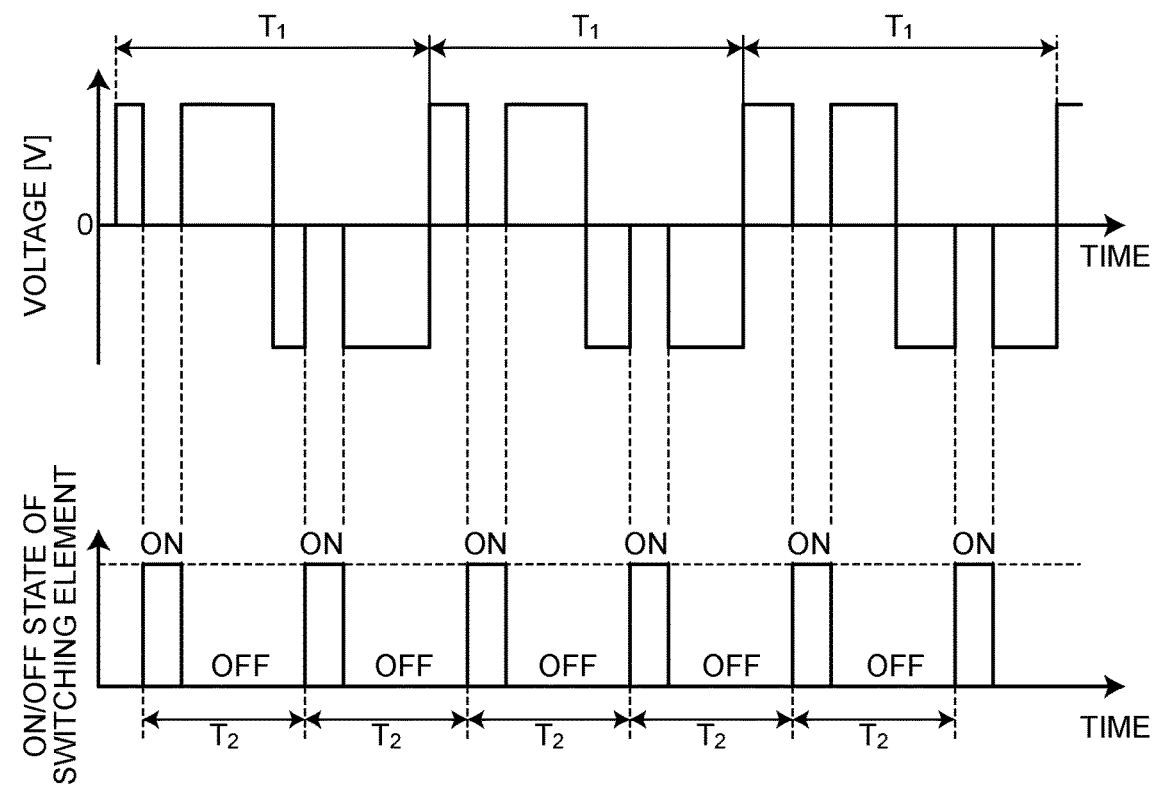
FIG. 13 is a diagram for describing a phase in which the short-circuit mode is executed, with respect to a voltage square wave.

As illustrated in FIG. 13, at a timing at which the switching element SW23 of the rectifier 23 switches from the off state to the on state, power control enters the short-circuit mode. The switching frequency is set to a frequency at which the short-circuit mode is executed twice during one cycle $T_1$ of the voltage square wave of the rectifier 23. That is, a switching cycle $T_2$ is shorter than the one cycle $T_1$ of the voltage square wave, and longer than a half cycle $T_1/2$ of the voltage square wave. In other words, the switching frequency is higher than the drive frequency of the inverter 12, and lower than a doubled value of the drive frequency of the inverter 12. Thus, a phase in which the short-circuit mode is executed gradually shifts with respect to the voltage square wave of the rectifier 23.

The control unit executes power control based on the switching frequency set by the setting unit. As power control, the control unit executes control in such a manner that a phase in which the short-circuit mode is executed gradually shifts with respect to a voltage square wave excited by the rectifier 23, as illustrated in FIGS. 12 and 13.

If the control device 24 executes the power control, a timing at which the short-circuit mode is executed gradually shifts with respect to the voltage square wave of the rectifier 23. A frequency of the voltage square wave excited by the rectifier 23 is set to the same value as the drive frequency of the inverter 12. The voltage square wave of the rectifier 23 is a wave synchronized with the drive frequency of the inverter 12. In contrast to this, the control device 24 performs switching control of the rectifier 23 at a frequency higher than the drive frequency, gradually shifts the phase in which the short-circuit mode is executed, with respect to the voltage square wave, and finally causes the phase to go through one cycle.

Figure 14:
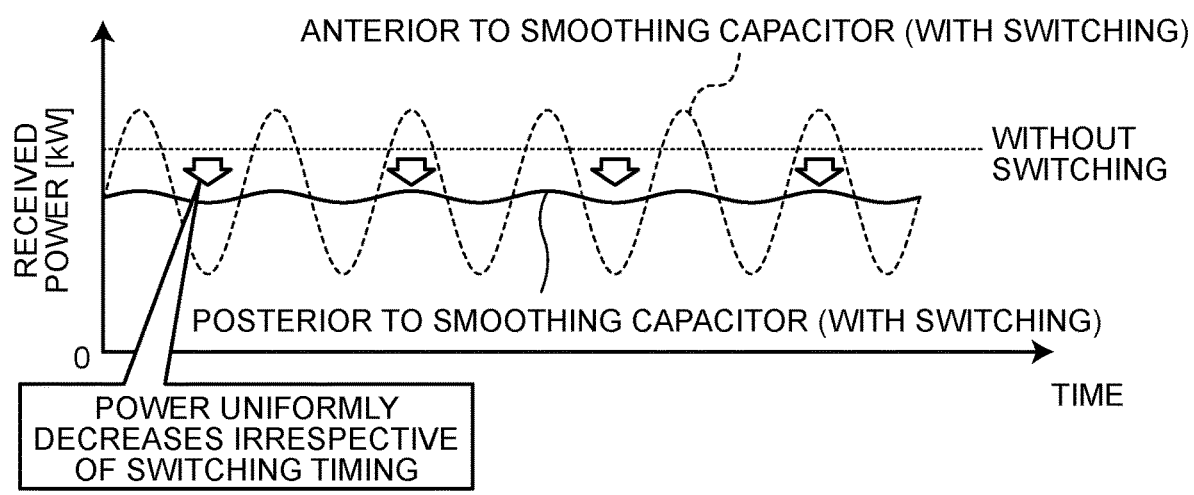
FIG. 14 is a diagram for describing that received power decreases.

Further, if the control device 24 executes the power control, because the phase in which the short-circuit mode is executed equally passes through a region that improves a phase shift between current and voltage, and a region that worsens a phase shift between current and voltage, a power increase and a power decrease are alternately repeated. By the phase in which the short-circuit mode is executed, going through one cycle between 0 degrees to 180 degrees, a power decrease and a power increase are cyclically repeated. Then, by the function of the smoothing capacitor C21 arranged immediately anterior to the battery 30, alternately-repeated power increase and power decrease are averaged. As a result, power increase and decrease caused by the improvement and worsening of a phase shift are cancelled. More specifically, a power variation caused in accordance with the phase of the short-circuit mode is cancelled in a time averaging manner, and an amplitude of the fundamental wave component decreases. Thus, as illustrated in FIG. 14, power to be finally supplied to the battery 30 becomes power that uniformly decreases. In this manner, a reduction of the amplitude of the voltage fundamental wave, and a power decrease caused by the reduction, which serve as an originally-intended function of the short-circuit mode, finally remain.

As described above, according to the embodiment, when power control is executed using the switching elements provided in the power receiving device 20, by setting a switching frequency to a value different from a drive frequency, a timing at which the short-circuit mode is executed gradually shifts with respect to the voltage square wave of the rectifier 23. This can prevent power from unintentionally increasing during power control. As a result, when performing contactless charging, it is possible to protect a load on the power receiving side.

Further, a power increase phenomenon caused by the short-circuit mode can be resolved without using a method with high cost and low robustness, such as a method of adding a sensor for precisely managing the phase of the short-circuit mode.

Note that, in the rectifier 23, the switching elements need not be connected in parallel to all diodes. For example, in a case where the switching elements are connected in parallel to the diode D21 and the diode D23 in the rectifier 23, the switching elements need not be connected in parallel to the diode D22 and the diode D24. Similarly, in a case where the switching elements are connected in parallel to the diode D22 and the diode D24 in the rectifier 23, the switching elements need not be connected in parallel to the diode D21 and the diode D23.

Further, in the contactless power transmission system 1 in which the power transmission device 10 is installed on the ground and the power receiving device 20 is mounted on the vehicle 100, cases are not limited to a case where contactless charging is performed while the vehicle 100 is running, and contactless charging can be performed in a state in which the vehicle 100 is stopped. That is, the mechanism of causing an increase in received power by a short circuit formed by the rectifier 23 is applicable not only to the dynamic power supply but also to stationary power supply. Thus, when power is received in a contactless manner from the power transmission device 10 on the ground side while the vehicle 100 is stopped, the control device 24 can execute the short-circuit mode by controlling the switching elements of the rectifier 23.

Further, the description has been given of a configuration in which the communication unit of the power receiving device 20 performs wireless communication with an infrastructure, but the configuration is not limited to this. For example, the power receiving device 20 can perform wireless communication with an external server. Alternatively, the power receiving device 20 can perform wireless communication with the power transmission device 10. A method of preliminarily acquiring information indicating a drive frequency of the inverter 12 on the power transmission side is not specifically limited.

Further, as a modified example of the embodiment, the short-circuit mode can be executed in the same phase every time, with respect to the voltage square wave. Here, the control device 24 according to the modified example will be described.

The control device 24 according to the modified example sets the number of times the short-circuit mode is executed in a voltage square wave, to an odd number of times equal to or larger than three times. Further, the control device 24 executes the short-circuit mode a plurality of times during one cycle of the voltage square wave at equal intervals, and executes the short-circuit mode in the same phase every time during each cycle of the voltage square wave.

Figure 15:
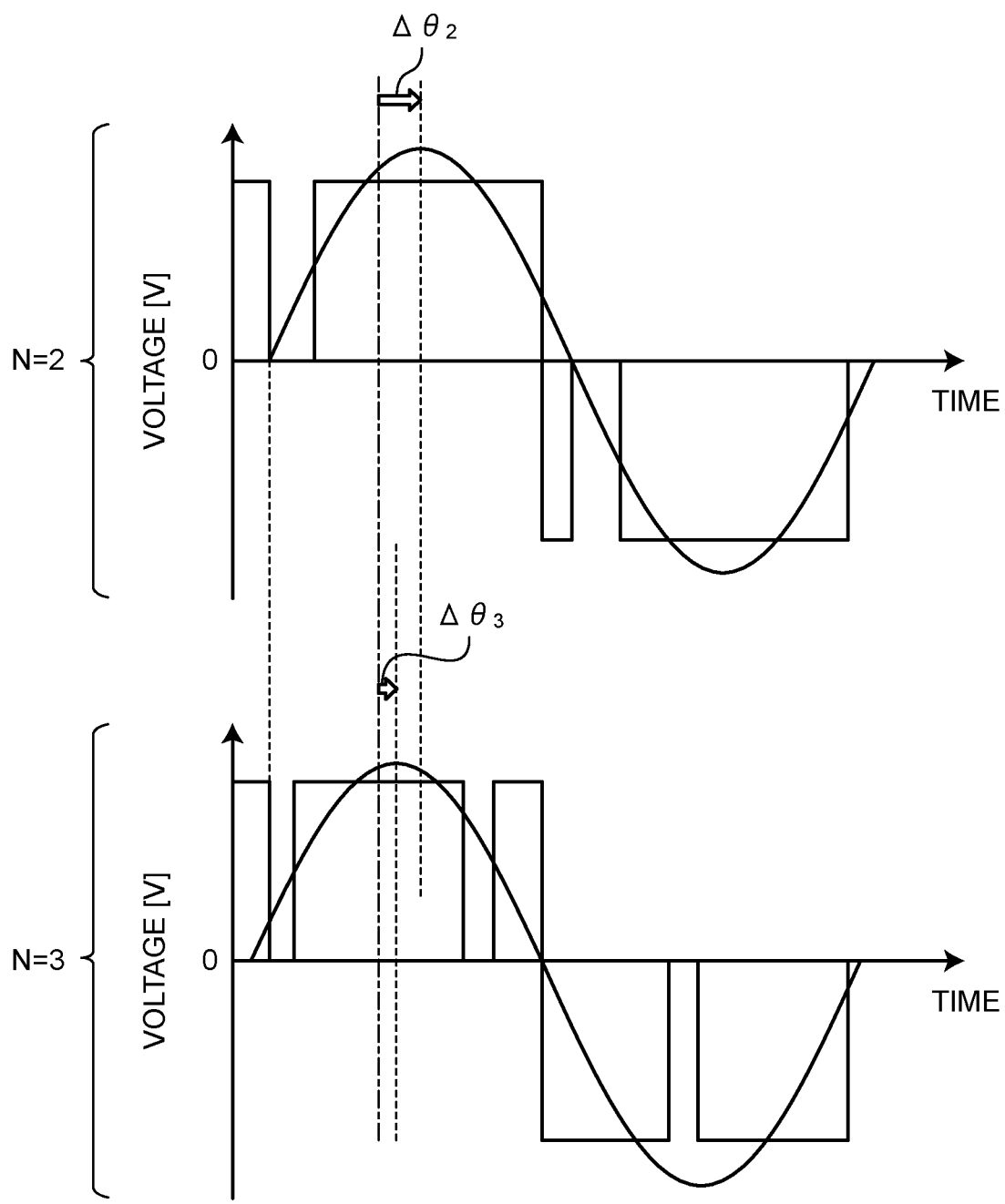
FIG. 15 is a diagram for comparing a phase shift amount generated in a case where the number of times the short-circuit mode is executed during one cycle of a voltage square wave is two, and a phase shift amount generated in a case where the number of times the short-circuit mode is executed during one cycle of a voltage square wave is three.

Specifically, the setting unit sets, as a switching frequency, a frequency at which the short-circuit mode is executed during one cycle (two waves) of the voltage square wave an odd number of times equal to or larger than three times. When executing power control, the control unit controls the short-circuit mode to be executed in the voltage square wave cyclically (i.e., at equal intervals). At this time, the short-circuit mode is executed during one cycle of the voltage square wave an odd number of times equal to or larger than three times. For comparison between an odd number of times equal to or larger than three times and an even number of times, FIG. 15 illustrates a voltage waveform generated in a case where the short-circuit mode is executed twice (N=2), and a voltage waveform generated in a case where the short-circuit mode is executed three times (N=3). Note that N denotes the number of times the short-circuit mode is started during one cycle of the voltage square wave. In other words, the number of short-circuit phases set during one cycle of the voltage square wave is denoted by N.

As illustrated in FIG. 15, in a case where the short-circuit mode is executed twice (N=2), the short-circuit mode is executed at positions in one wave of the voltage square wave that lean to the left side, and the short-circuit mode is executed twice in total during one cycle (two waves) of the voltage square wave. In a case where the positions of the short-circuit mode lean to the left side, phase shifting with a phase shift $\Delta\theta_2$ occurs in such a manner that a fundamental wave component of a voltage waveform is pushed out rightward. Further, in a case where the short-circuit mode is executed twice (N=2), the short-circuit mode is sometimes caused at a position leaning to the right side in one wave of a voltage square wave as illustrated in FIG. 11. In a case where the position of the short-circuit mode leans to the right side, phase shifting occurs in such a manner that a fundamental wave component of a voltage is pushed out leftward. That is, in a case where the number of times the short-circuit mode is executed during one cycle of the voltage square wave becomes an even number of times, a thinning-out position (the period of the short-circuit mode) leans to either one side of the left and right sides. The same applies to an even number of times equal to or larger than twice (i.e., an even number of times equal to or larger than four times).

Then, in a case where the direction of the phase shifting is identical to a direction of reducing a phase shift between a current fundamental wave and a voltage fundamental wave, because a phase factor of received power improves, a power increase is finally caused. On the other hand, in a case where the direction of the phase shifting is identical to a direction of expanding a phase shift between a current fundamental wave and a voltage fundamental wave, because a phase factor of received power worsens, power decreases. That is, even in a case where phase shifting of the voltage fundamental wave occurs in the direction of improving a phase factor, by reducing a phase shift amount of the phase shifting, a power increase amount can be suppressed.

In a case where the short-circuit mode is executed three times (N=3), the short-circuit mode is executed three times during one cycle (two waves) of the voltage square wave, and the positions of the short-circuit mode become positions on the left side, the center side, and the right side of the voltage square wave. In a case where the short-circuit mode is executed three times, as compared with a case where the short-circuit mode is executed twice, the short-circuit mode is executed at positions distributed leftward and rightward. Then, phase shifting with a phase shift $\Delta\theta_3$ occurs in such a manner that a fundamental wave component of a voltage waveform is pushed out rightward. The phase shift $\Delta\theta_2$ generated in a case where the short-circuit mode is executed three times is smaller than the phase shift $\Delta\theta_2$ generated in a case where the short-circuit mode is executed twice. With this configuration, a phase shift amount by which the voltage fundamental wave is pushed out leftward or rightward is suppressed. Thus, phase factor improvement and a power increase that are attributed to phase shifting become less likely to occur.

Figure 16:
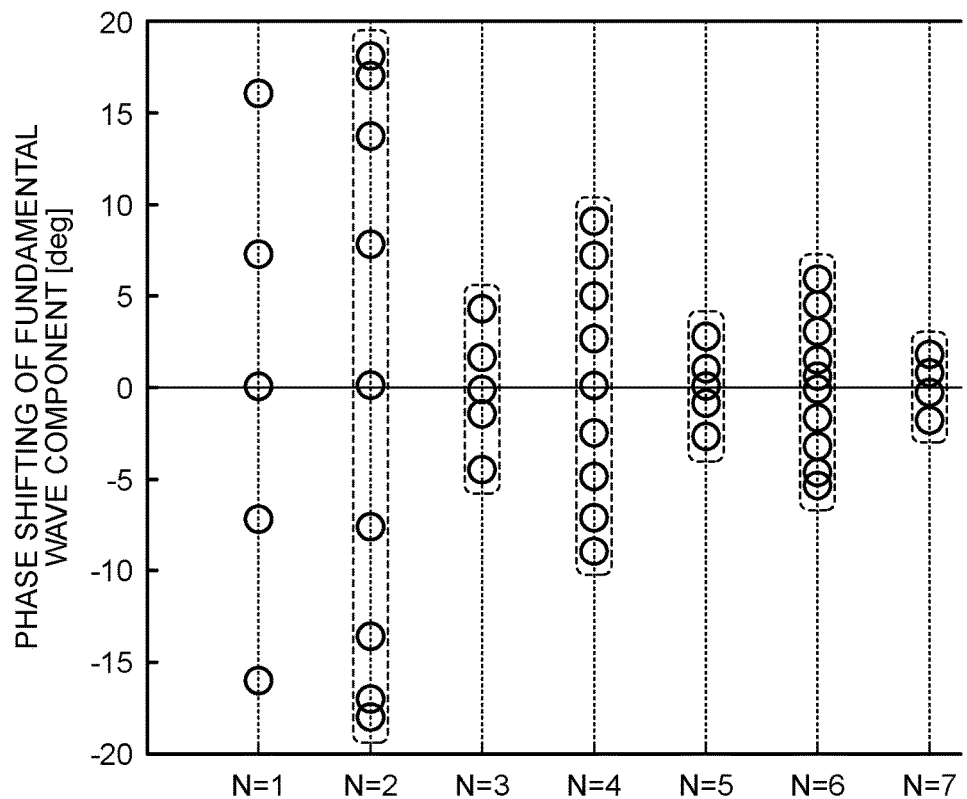
FIG. 16 is a diagram illustrating a relationship between the number of times the short-circuit mode is executed during one cycle of a voltage square wave, and a phase shift amount of a fundamental wave component.
Figure 17:
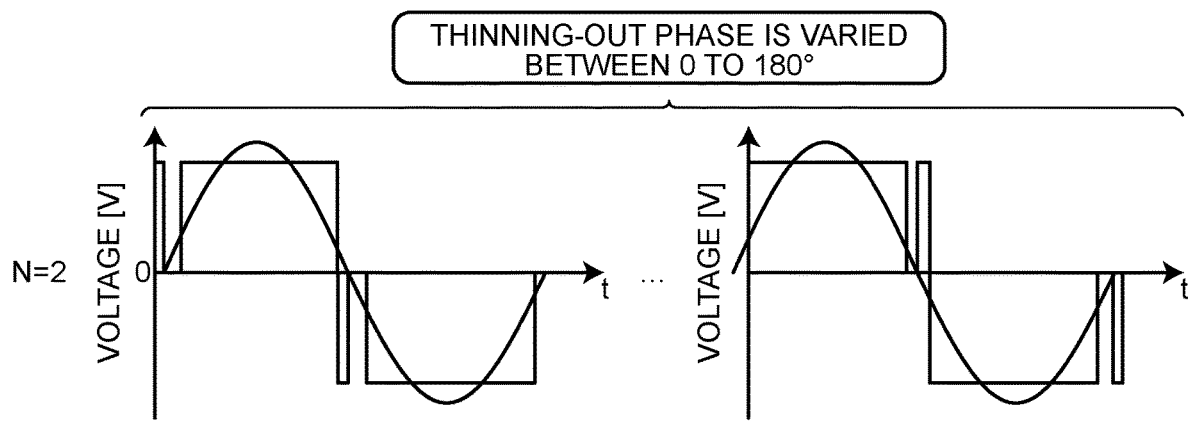
FIG. 17 is a diagram for describing a case where the number of times the short-circuit mode is executed during one cycle of a voltage square wave is two.

FIG. 16 is a diagram illustrating a relationship between a phase shift amount of a fundamental wave component and the number of times the short-circuit mode is executed. Note that N denotes the number of times the short-circuit mode is executed during one cycle (two waves) of the voltage square wave. Further, in FIG. 16, a plurality of points is plotted. The points indicate results obtained by executing the short-circuit mode in different phases in a case where the number of times the short-circuit mode is executed remains the same as illustrated in FIG. 17.

As illustrated in FIG. 16, in a case where N=2, phase shifting of the voltage fundamental wave was about ±17 degrees at most. In contrast to this, in a case where N=3, phase shifting of the voltage fundamental wave was about ±5 degrees. When comparison is made between a case where the number of times the short-circuit mode is executed is two, and a case where the number of times the short-circuit mode is executed is three, in a case where the number of times the short-circuit mode is executed is three, a phase shift amount can be drastically reduced. The same applies to an odd number of times equal to or larger than five times, such as N=5 or 7. In this manner, in a case where the number of times is an odd number of times equal to or larger than three times, as compared with a case where the number of times is an even number of times, a phase shift amount of the voltage fundamental wave is reduced.

According to this modified example, by setting the number of times the short-circuit mode is executed during one cycle of the voltage square wave, to an odd number of times equal to or larger than three times, such as three times, five times, or seven times, as compared with a case where the short-circuit mode is executed twice, a phase shift amount of the voltage fundamental wave can be reduced. With this configuration, it is possible to suppress a power increase caused by the execution of the short-circuit mode.

In the present disclosure, by setting the switching frequency of the rectifier circuit to a value different from the drive frequency of the inverter on a power transmission side, it is possible to suppress a power increase when a short circuit is formed by an operation of the switching element.

According to an embodiment, by setting the switching frequency of the rectifier circuit to a value different from the drive frequency of the inverter on a power transmission side, it is possible to suppress a power increase when a short circuit is formed by an operation of the switching element.

According to an embodiment, the switching frequency becomes higher than the drive frequency, and by a phase in which the short-circuit mode is executed, gradually shifting, both of phase factor improvement and phase factor worsening that are attributed to phase shifting occur. Because the cyclic variation of power is smoothed by the smoothing capacitor, power to be finally supplied to the load uniformly decreases.

According to an embodiment, the switching frequency becomes higher than the drive frequency, and by the short-circuit mode being executed an odd number of times equal to or larger than three times during one cycle of the voltage square wave, a phase shift amount of a fundamental wave component can be reduced. This can suppress a power increase that occurs in accordance with phase shifting.

According to an embodiment, even in a case where the short-circuit mode is executed in the same phase every time in the voltage square wave, a power increase can be suppressed.

According to an embodiment, in the contactless power transmission system including the power transmission device and the power receiving device, by setting the switching frequency of the rectifier circuit to a value different from the drive frequency of the inverter on a power transmission side, it is possible to suppress a power increase when a short circuit is formed by an operation of the switching element.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power receiving device comprising:
a power receiving coil configured to receive power transmitted in a contactless manner from a power transmission coil of a power transmission device;
a rectifier circuit provided between the power receiving coil and a load;
a smoothing capacitor provided between the rectifier circuit and the load; and
a control device configured to execute a short-circuit mode of short-circuiting between output ends of the power receiving coil, by performing a switching operation on switching elements provided in the rectifier circuit,
wherein the control device includes
an acquisition unit configured to acquire information indicating a drive frequency of an inverter provided in the power transmission device,
a setting unit configured to set a switching frequency of the rectifier circuit to a value different from the drive frequency of the inverter, and
a control unit configured to execute the short-circuit mode based on the switching frequency set by the setting unit,
wherein the switching frequency is a value larger than the drive frequency, and is a frequency at which a phase in which the short-circuit mode is executed gradually shifts with respect to a voltage square wave of the rectifier circuit, and sweeps between 0 degrees to 180 degrees.

2. A power receiving device comprising:
a power receiving coil configured to receive power transmitted in a contactless manner from a power transmission coil of a power transmission device;
a rectifier circuit provided between the power receiving coil and a load;
a smoothing capacitor provided between the rectifier circuit and the load; and
a control device configured to execute a short-circuit mode of short-circuiting between output ends of the power receiving coil, by performing a switching operation on switching elements provided in the rectifier circuit,
wherein the control device includes
an acquisition unit configured to acquire information indicating a drive frequency of an inverter provided in the power transmission device,
a setting unit configured to set a switching frequency of the rectifier circuit to a value different from the drive frequency of the inverter, and
a control unit configured to execute the short-circuit mode based on the switching frequency set by the setting unit,
wherein the switching frequency is a value larger than the drive frequency, and is a frequency at which a number of times the short-circuit mode is executed during one cycle of a voltage square wave of the rectifier circuit becomes an odd number of times equal to or larger than three times.

3. The power receiving device according to claim 2,
wherein the control unit executes the short-circuit mode a plurality of times during one cycle of the voltage square wave at an equal interval, and executes the short-circuit mode in a same phase every time during each cycle of the voltage square wave.

4. A contactless power transmission system comprising:
the power receiving device according to claim 1; and
the power transmission device including the power transmission coil.

5. A contactless power transmission system comprising:
the power receiving device according to claim 2; and
the power transmission device including the power transmission coil.

* * * * *